J. LUMBERT

DOOR-HANGER.

No. 6,735. Reissued Nov. 9, 1875.

Witnesses:

L. F. Brous,

A. P. Grant.

Inventor:

Jos. Lumbert by

John A. Wiedersheim

Atty.

UNITED STATES PATENT OFFICE.

JOSEPH LUMBERT, OF WILBRAHAM, MASSACHUSETTS.

IMPROVEMENT IN DOOR-HANGERS.

Specification forming part of Letters Patent No. 161,619, dated April 6, 1875; reissue No. 6,735, dated November 9, 1875; application filed July 31, 1875.

*To all whom it may concern:*

Be it known that I, JOSEPH LUMBERT, of Wilbraham, in the county of Hampden and State of Massachusetts, have invented a new and useful Improvement in Hangers for Sliding Doors; and I do hereby declare the following to be a clear and exact description of the nature thereof, sufficient to enable others skilled in the art to which my invention appertains to fully understand, make, and use the same, reference being had to the accompanying drawings making part of this specification, in which—

Figure 1:
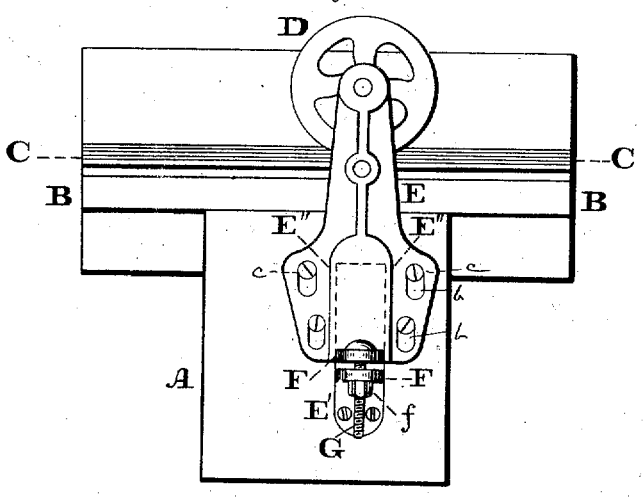
Figure 2:
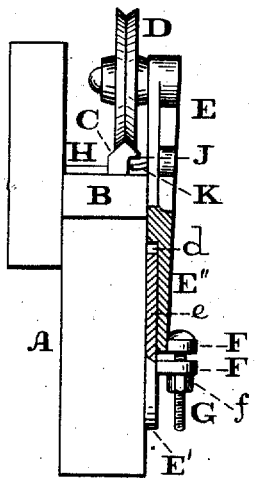
Figure 3:
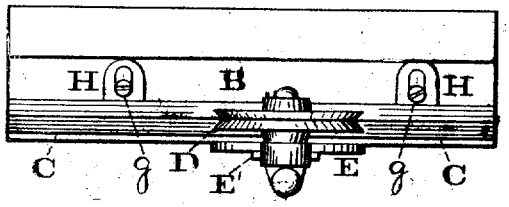

Figure 1 is a front view of the device embodying my invention. Fig. 2 is a side view thereof, partly sectional. Fig. 3 is a top view thereof.

Similar letters of reference indicate corresponding parts in the several figures.

My invention consists in a novel vertically-adjustable bracket for the roller or sheave. It also consists in a laterally-adjustable rail for the roller or sheave. It further consists in means for preventing the roller "jumping" the rail.

Referring to the drawings, A represents a sliding door, and B the sill or projection secured to the building or other structure over the door, and supporting a rail, C. D represents a roller or sheave, which is to run on the rail C, and it has its axis on a bracket, E, which is secured to the door A, whereby said door is suspended from the rail C. The bracket E is constructed of two parts or plates, of which one plate, E′, is firmly secured to the door. The other plate, E″, on which the roller has its axis, has a sliding motion, and in order to connect said plate E″ to the door it is formed with a longitudinally-extending groove or depression, *d*, which receives the tongue or length *e* of the other plate, E′, whereby the sliding plate is firmly guided in its motions. Lugs F F project from the plate E″, and a proper point of the plate E′, so that an adjusting screw-bolt, G, may be passed through the two lugs. Openings *b b* are formed in one plate of the bracket, and through said slots there are passed screws *c*, which penetrate the door, thus serving to assist in connecting said plate to the door.

It will be seen that the door may be readily raised or lowered for purposes of adjustment by operating the bolt G, so that the plate E″ will be brought nearer to or farther from the plate E′, or the bracket E will be lengthened or shortened. When the adjustment is accomplished a nut or other fastening device, *f*, may be employed to prevent rotation or movement of the bolt. The rail C is formed at its base with lateral extensions H, which are slotted transversely, and through the slots are passed the screws *g*, by which the rail is secured to the sill B.

It will be seen that the rail may be adjusted transversely, so as to set farther in or out on said sill B, and thus render service in cases where the door runs in contact with the casing, and thus rubs thereagainst, where there is variation in the thickness of the door, and for other purposes requiring adjustment. The rail is channeled in the direction of its length, so as to form a shoulder J, and from the inner face of the bracket E there projects horizontally a lug, K, which is adapted to occupy a position under the shoulder J.

It will be seen that the lug or projection K will hold the roller on the rail, and thus prevent the displacement or jumping of said roller, without, however, interfering with the movements of the roller and door.

Having thus described my invention, what I claim as new, and desire to secure by Letters Patent, is—

1. The sheave-bracket, consisting of two parts, E′ E″, connected by a guiding-tongue, *e*, and groove, *d*, the fastening-screws *c*, and an adjusting screw-bolt, G, thereby giving vertical adjustability, substantially as and for the purpose set forth.

2. The combination, with the sheave D, of the supporting-rail C, made transversely-adjustable by means of slots, and the screws *g*, substantially as and for the purpose set forth.

3. The combination, with the sheave-bracket and rail, of a projection or lug on one part engaging with a shoulder on the other part, substantially as and for the purpose set forth.

JOSEPH LUMBERT.

Witnesses:
L. B. BLISS,
HARRIET A. BLISS.